(12) United States Patent
Komatsu

(10) Patent No.: US 6,318,306 B1
(45) Date of Patent: Nov. 20, 2001

(54) INTERNAL COMBUSTION ENGINE EQUIPPED WITH FUEL REFORMING SYSTEM

(75) Inventor: Hiroshi Komatsu, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/543,592

(22) Filed: Apr. 5, 2000

(30) Foreign Application Priority Data

Apr. 6, 1999 (JP) ................................................ 11-098416

(51) Int. Cl.⁷ ..................................................... F02B 43/08
(52) U.S. Cl. ................................................................ 123/3
(58) Field of Search ................................. 123/3, 525, 577

(56) References Cited

U.S. PATENT DOCUMENTS

| 3,717,129 | * | 2/1973 | Fox | 123/3 |
| 3,901,197 | * | 8/1975 | Noguchi et al. | 123/3 |
| 3,955,941 | * | 5/1976 | Houseman et al. | 123/3 |
| 4,122,802 | * | 10/1978 | Noguchi et al. | 123/3 |
| 4,161,164 | * | 7/1979 | Muhlberg | 123/3 |
| 4,185,595 | * | 1/1980 | Muhlberg | 123/3 |
| 5,515,814 | * | 5/1996 | Cooke | 123/3 |

FOREIGN PATENT DOCUMENTS 52-98819   8/1977   (JP) .

* cited by examiner

Primary Examiner—Willis R. Wolfe
Assistant Examiner—Jason Benton
(74) Attorney, Agent, or Firm—Foley & Lardner

(57) ABSTRACT

An internal combustion engine equipped with a fuel reforming system is provided. By the system, fuel (hydrocarbon fuel) is gasified by an evaporator by using an exhaust heat. A mixture of a gas (hydrocarbon gas and water vapor) from an evaporator and air is supplied to a reforming device to reform fuel by a water vapor reformation reaction and a partial oxidation reaction. A reformed gas mixture from the reforming device is supplied to a cooling device to be cooled. By this, the hydrocarbon gas kept unreformed is condensed into a high octane liquid fuel and separated from the reformed gas. The reformed gas is stored in a tank and supplied to an engine by means of a gas fuel injector at a partial load engine operating condition. The high octane liquid fuel is stored in a tank and supplied to the engine by a liquid fuel injector at a high load engine operating condition.

15 Claims, 4 Drawing Sheets

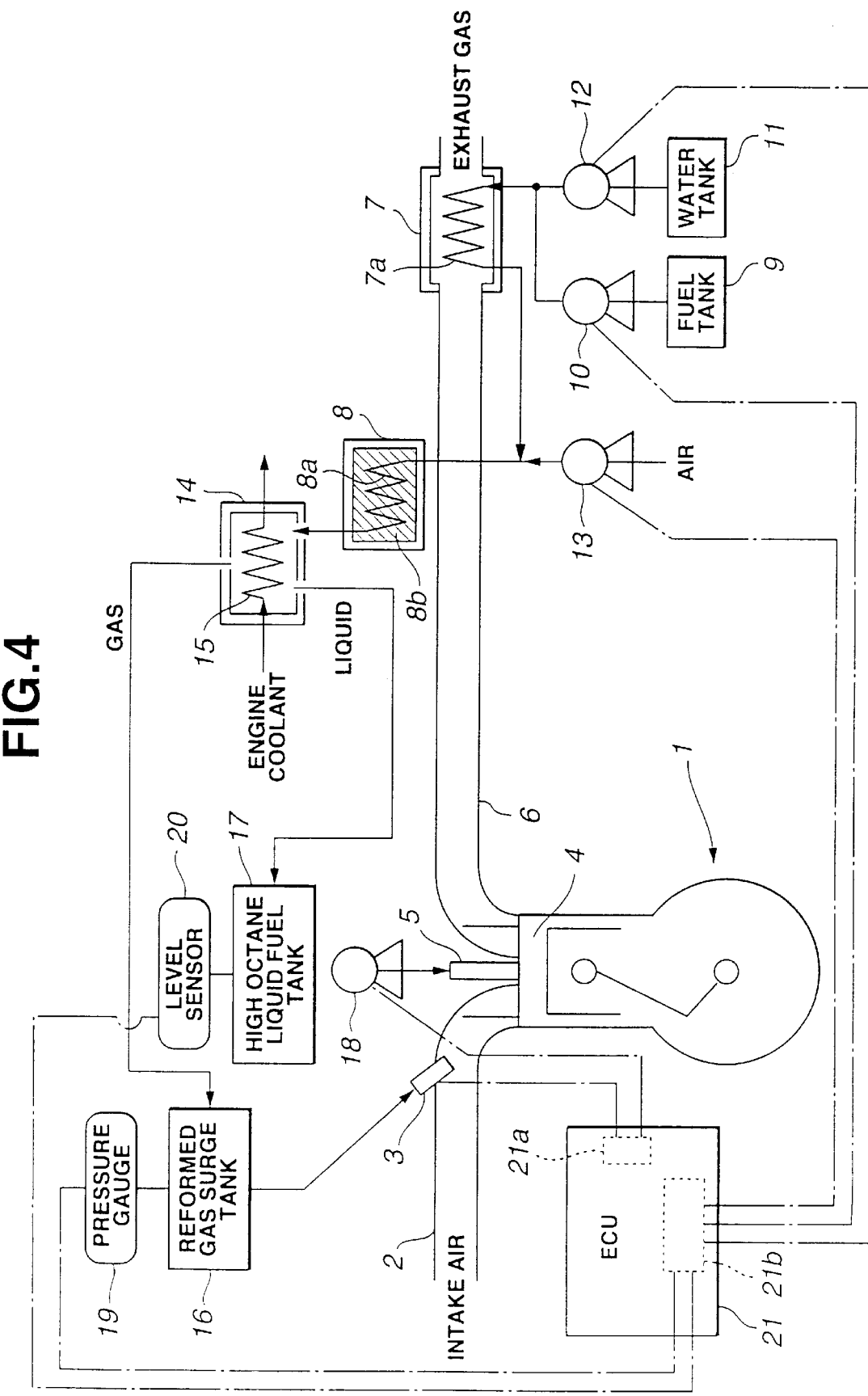

INTERNAL COMBUSTION ENGINE EQUIPPED WITH FUEL REFORMING SYSTEM

BACKGROUND OF THE INVENTION

1. Technical Field

The present invention relates in general to a process and system for reforming a hydrocarbon fuel and particularly to an internal combustion engine equipped with a fuel reforming system.

2. Background Information

A prior art internal combustion engine equipped with a fuel reforming device is disclosed in Japanese Patent Provisional Publication No. 52-98819.

In such an internal combustion engine, fuel (i.e., hydrocarbon fuel) is conveyed from a fuel tank to a separator by way of a pump. Within the separator, fuel is separated into a hydrocarbon gas which is a lower boiling point component and a liquid hydrocarbon which is a higher boiling point component. The hydrocarbon gas of a lower boiling point component is conveyed to a reforming device where it is reformed into a gas of a large hydrogen content, and supplied to an engine by way of a mixing device. The liquid hydrocarbon of a high boiling point component is kept unreformed and supplied to the engine by way of an injector.

SUMMARY OF THE INVENTION

Hydrocarbon has such characteristics that increase of the hydrocarbon content causes the boiling point to become higher but does not always cause the octane value to become higher. In the prior art internal combustion engine equipped with a fuel reforming system, the octane value of the liquid hydrocarbon which is a higher boiling point component and resulted from separation by the separator, is nearly equal to that of original hydrocarbon fuel. The internal combustion engine equipped with a fuel reforming device inherently aims at combusting an air-fuel mixture which is compressed to a high compression ratio by the use of a reformed gas for thereby making the thermal efficiency higher. The prior art internal combustion engine equipped with a fuel reforming system has a problem that the compression ratio cannot be made higher on consideration of the time of operation of the engine under supply of the liquid hydrocarbon.

It is accordingly an object of the present invention to provide an internal combustion engine equipped with a fuel reforming system which is adapted to operated under supply of one of or both of a reformed gas and a liquid fuel, which can make higher the compression ratio at the time of operation under supply of the liquid fuel and thereby improve the fuel consumption and the output of the engine considerably.

To achieve the above object, the present invention provides an internal combustion engine equipped with a novel and improved fuel reforming system. The fuel reforming system comprises a reforming device for receiving a feed of hydrocarbon fuel, water and air and discharging a reformed gas mixture including a reformed gas and a hydrocarbon gas remaining unreformed, through reformation of the hydrocarbon fuel by a water vapor reformation reaction and a partial oxidation reaction, a cooling device for cooling the mixed gas drawn from the reforming device in such a manner that the hydrocarbon gas is condensed into a high octane liquid fuel and separated from the reformed gas, and a selection control device for controlling selection of the reformed gas and the high octane liquid fuel for use in the engine in accordance with an engine operating condition.

BRIEF DESCRIPTION OF THE DRAWINGS

FIG. 4 is a view similar to FIG. 1 but shows another embodiment of the present invention.

DESCRIPTION OF THE PREFERRED EMBODIMENTS

Figure 1:
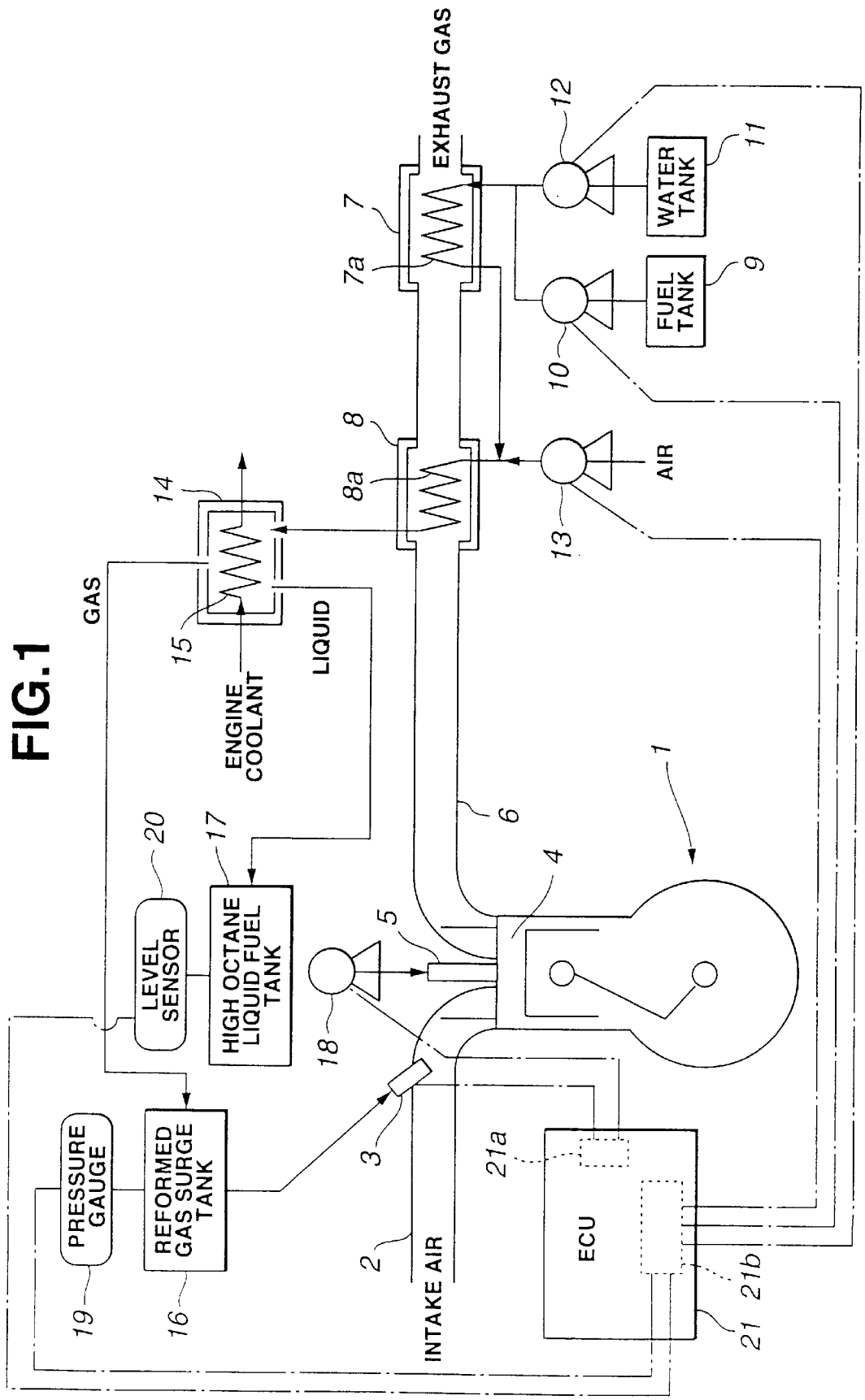
FIG. 1 is a schematic view of an internal combustion engine equipped with a fuel reforming device according to an embodiment of the present invention.

Referring first to FIG. 1, an internal combustion engine equipped with a fuel reforming device according to an embodiment of the present invention is generally indicated by 1.

The engine 1 includes an intake system 2 having a gas fuel injector 3 for injecting a gas fuel into an intake passage and a combustion chamber 4 provided with a liquid fuel injector 5 for injecting a liquid fuel directly into the combustion chamber 4.

An exhaust system 6 of the engine 1 has an evaporator 7 for gasifying a liquid mixture consisting of liquid fuel (hydrocarbon fuel) and water by using exhaust heat, and a reforming device for reforming a mixed gas consisting of a gas from the evaporator 7 (i.e., hydrocarbon gas and water vapor) and air by exhaust heat and a reforming catalyst. The evaporator 7 and the reforming device 8 are disposed at an upstream part of the exhaust system 6.

In this instance, fuel is drawn from a fuel tank 9 to a fuel pump 10, and water is drawn from a water tank 11 to a water pump 12. The fuel and water are supplied to the evaporator 7 after being mixed up. The liquid mixture supplied to the evaporator 7 absorbs the exhaust heat during passage through a heat exchanging pipe 7a within the evaporator 7 and gasified.

The gas (i.e., hydrocarbon gas and water vapor) from the evaporator 7 is mixed with the air from an air pump 12 and thereafter supplied to the reforming device 8. A portion of the mixed gas supplied to the reforming device 8 is converted to a reformed gas (gas containing $H_2$, CO, i.e., hydrogen-containing gas) during its passage through a heat exchanging pipe 8a disposed within the reforming device 8 and filled with a reforming catalyst, by a vapor reformation reaction and a partial oxidation reaction, and the remainder (mainly, aromatics) remains unreformed and in a hydrogen gas state, the both (i.e., a portion of the mixed gas converted into the reformed gas and the remainder) being supplied to a cooling device (condenser) 14.

Disposed within the cooling device 14 is a cooling pipe 15 through which engine coolant passes. By the cooling device 14, the hydrocarbon gas remaining unreformed is condensed and separated from the reformed gas for use as a high octane liquid fuel.

That is, the reformed gas which is a portion of the gas coming out of the reforming device 8 is only cooled by the cooling device 14 and is made to stay separately in the upper space within the cooling device 14. The hydrocarbon gas which is the remainder of the gas coming out of the reforming device 8 and remains unreformed is cooled by the cooling device 14 and thereby condensed to be liquefied for use as a high octane liquid fuel and is made to stay separately at the bottom of the cooling device 14.

It is the characteristics of hydrocarbon that such hydrocarbon that is hard to be reformed has a stronger interatomic bond and is therefore a stabler molecule, i.e., such hydrocarbon has a high octane value. Accordingly, by condensing the hydrocarbon which remains unreformed even after passage through the reforming device 14, by means of the cooling device 14 and thereby separating it from the reformed gas, a high octane component can be extracted and therefore a high octane liquid fuel can be obtained.

The reformed gas separated by the reforming device 14 is taken out from the upper space of the reforming device 14 and is stored in a reformed gas surge tank 16. After that, the reformed gas is fed to the gas fuel injector 3.

On the other hand, the high octane liquid fuel is taken out from the bottom of the reforming device 14 and is stored in a high octane fuel tank 17. After that, the high octane liquid fuel is lead to the liquid fuel injector 5 by means of a fuel pump 18.

In this connection, to the reformed gas surge tank 16 is attached a pressure gauge 19 for measuring the pressure within the surge tank 16 and thereby detecting a quantity of reformed gas kept in store in the surge tank 16. That is, the pressure gauge 19 is adapted to serve as a sensor or detector for detecting the quantity of reformed gas in store. To the high octane liquid fuel tank 17 is attached a level gauge 20 for measuring the liquid level of high octane liquid fuel in the fuel tank 17 and thereby detecting the quantity of the high octane liquid fuel in store. That is, the level gauge 20 is adapted to serve as a sensor or detector for detecting the quantity of high octane liquid fuel in store.

The internal combustion engine 1 is provided with an engine control unit (ECU) 21 for electronic engine controls. The ECU 21 includes a selection control means 21a for controlling selection of the reformed gas and the high octane liquid fuel for use in the engine through control of the gas fuel injector 3 and the liquid fuel injector 5 in accordance with the engine operating condition. The control means 21a is actually constituted by a software program or computer program incorporated in the ECU 21. In the meantime, the excess air factor λ at the time of use of the reformed gas is about 2.5, and the excess air factor λ at the time of use of the high octane liquid fuel is about 1.0.

Figure 2:
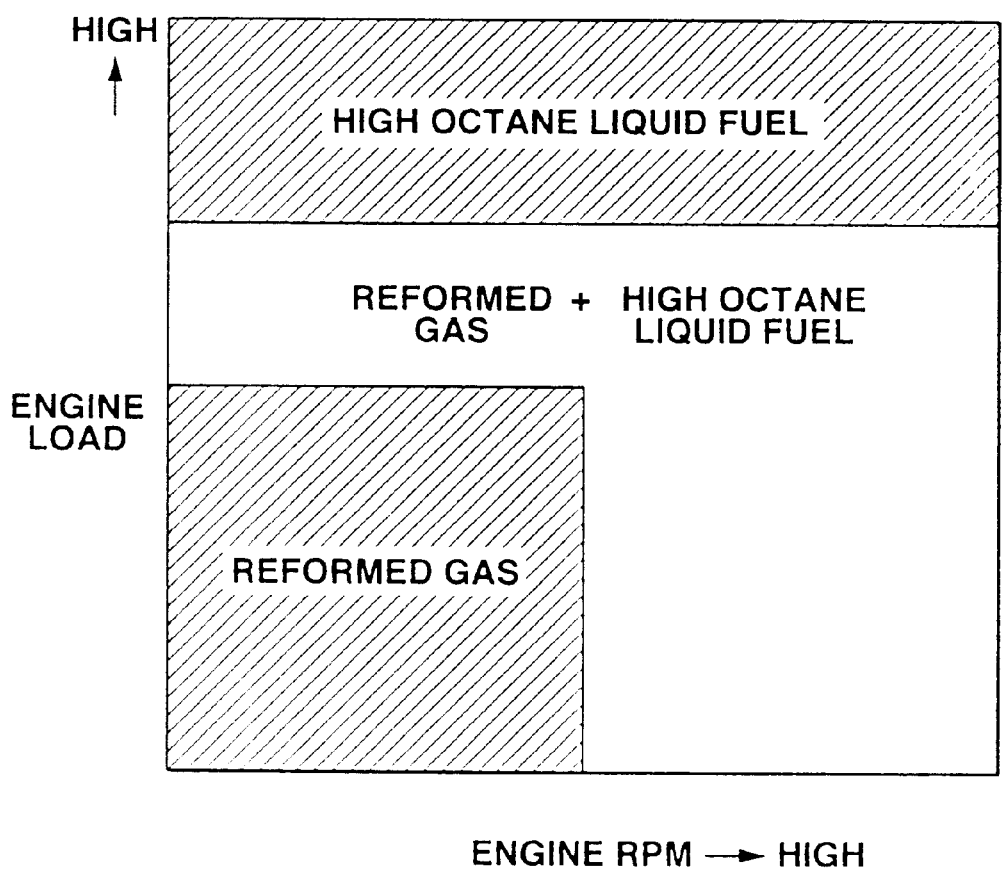
FIG. 2 is an illustration of selective use of a reformed gas and a liquid fuel in accordance with an engine operating condition.

Referring to FIG. 2, use of the reformed gas and the high octane liquid fuel in dependence upon the engine operating condition, under control of the control means 21a of the ECU 21, will be described.

Under a partial load engine operating condition, i.e., in the area of the graph of FIG. 2 in which the engine load is low and the engine rpm is low (i.e., the area of an engine operating condition at usual driving), the reformed gas is used. By this, the exhaust heat is recovered and furthermore the hydrogen gas enables lean burn and has such characteristics that it does not cause knocking even at high compression ratio, thus making it possible to improve the fuel consumption considerably.

Under a high load engine operating condition, that is, in the area of the graph of FIG. 2 in which the engine load is high, the high octane liquid fuel is used. If the gas fuel is used in this area, the charging efficiency of the air is lowered to reduce the output. Thus, it is necessitated to use in this area, fuel which is liquid fuel and furthermore which has a high octane value.

In the intermediate area other than the above described two areas, both the reformed gas and the high octane liquid fuel are used. More specifically, the reformed gas is mainly used and the high octane liquid fuel is used to supply the shortage.

For this way of use, it is necessitated to keep the quantity of storage in each of the reformed gas surge tank 16 and the high octane liquid fuel tank 17 within the specified limits. To this end, the quantity of fuel supplied by the fuel pump 10, the quantity of water supplied by the water pump 12 and the quantity of air supplied by the air pump 13 are controlled accurately.

Figure 3:
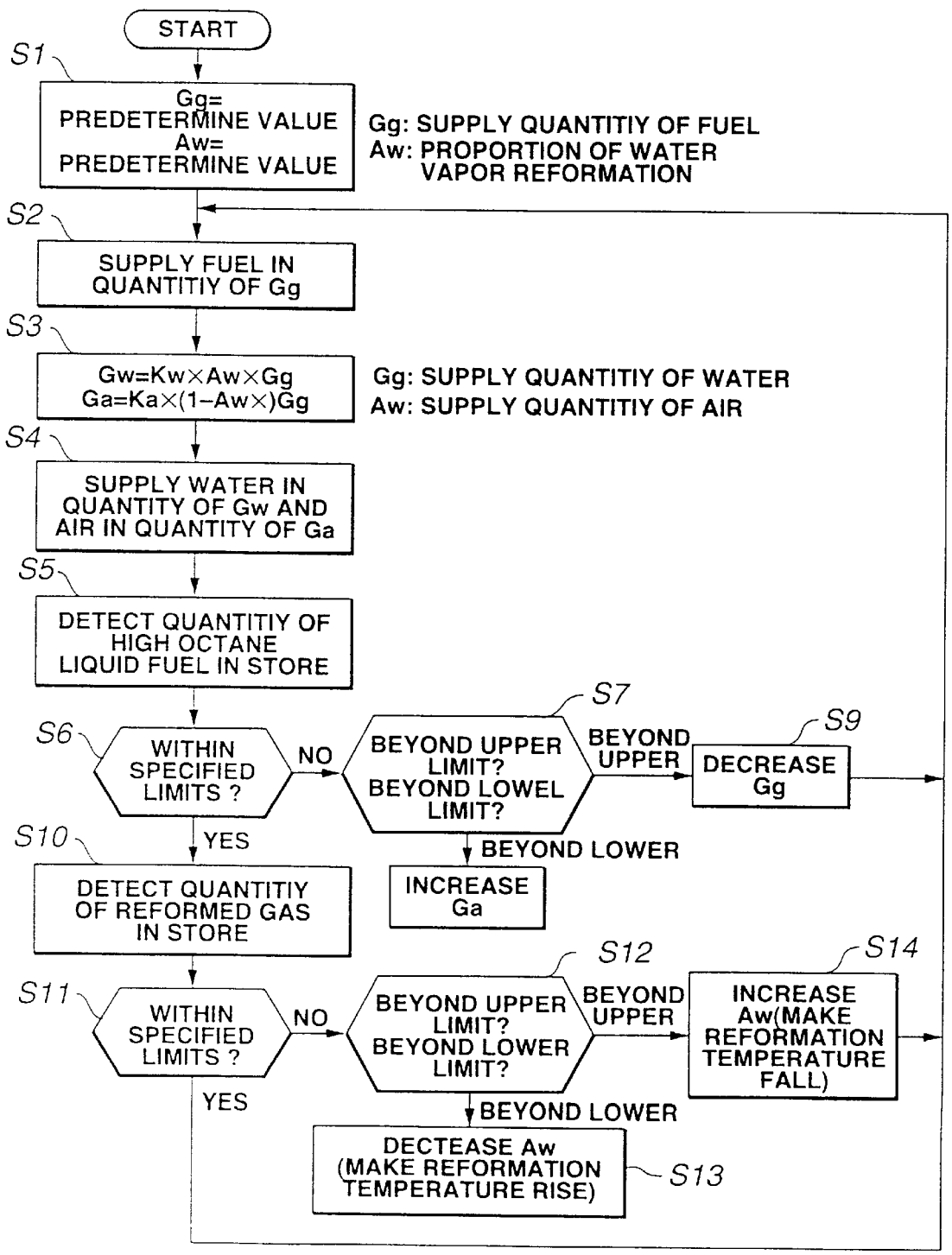
FIG. 3 is a flow chart of a process for controlling production of a reformed gas.

The flow of operations for such control will be described with reference to FIG. 3. The flow chart shown in FIG. 3 constitutes a reformation control means 21b incorporated in the ECU 21, that is, the reformation control means 21b is constituted by such a software program or computer program shown in FIG. 3 and incorporated in the ECU 21.

At step S1, as initial values of a supply quantity Gg of fuel (the term "supply quantity of fuel" is herein used to indicate the fuel volume discharged by the fuel pump 9 per unit time) and a proportion Aw of water vapor reformation, predetermined values are given. In the meantime, $0 \leq Aw \leq 1$.

At step S2, the fuel pump 10 is controlled so as to supply fuel in quantity of Gg.

At step S3, by the following equation and on the basis of the supply quantity Gg of fuel and the proportion Aw of water vapor reformation, a supply quantity Gw of water (the term "supply quantity of water" is herein used to indicate the water volume discharged by the water pump 11 per unit time) is calculated.

Gw = Kw×Aw×Gg where Kw is constant.

Further, by the following equation and on the basis of the supply quantity Gg of fuel and the proportion Aw of water vapor reformation (proportion of partial oxidation is 1−Aw), a supply quantity Ga of air (the term "supply quantity of air" is herein used to indicate the air volume discharged by the air pump 13 per unit time) is calculated.

Ga = Ka×(1−Aw)×Gg where Ka is constant.

At step S4, the water pump 12 is controlled so as to supply water in quantity of Gw, and the air pump 13 is controlled so as to supply air in quantity of Ga.

At step S5, the quantity of high octane liquid fuel in store, i.e., the output of the level gauge 20 provided to the high octane liquid fuel tank 17 (i.e., liquid level) is read.

At step S6, it is judged whether the quantity of high octane liquid fuel in store (i.e., output of level gauge 20) is within specified limits (i.e., within upper and lower limits). When the quantity of high octane liquid level in store is beyond the specified limits, the program proceeds to step S7.

At step S7, it is judged whether the quantity of high octane liquid fuel in store is beyond the upper limit or the lower limit.

When the quantity of high octane liquid fuel in store is judged to be beyond the lower limit, the program proceeds to step S8 to increase the supply quantity Gg of fuel by a fixed quantity (Gg=Gg+ΔGg where ΔGg is a fixed quantity), and returns to step S2.

When the quantity of high octane liquid fuel in store is judged to be beyond the upper limit, the program proceeds to step S9 to decrease the supply quantity Gg of fuel by a fixed quantity (Gg=Gg−ΔGg), and returns to step S2.

When it is judged at step S6 that the quantity of high octane liquid fuel in store (i.e., output of level gauge 20) is within the specified limits, the supply quantity Gg of fuel is not altered and the program proceeds to step 10.

At step S10, the quantity of reformed gas in store, i.e., the output of the pressure gauge 19 provided to the reformed gas surge tank 16 (i.e., tank internal pressure) is read.

At step S11, it is judged whether the quantity of reformed gas in store (output of pressure gauge 19) is within specified limits (i.e., within upper and lower limits). When the quantity of reformed gas in store is judged to be beyond the limits, the program proceeds to step S12.

At step S12, it is judged whether the quantity of reformed gas in store is beyond the upper limit or the lower limit. When the quantity of reformed gas in store is beyond the lower limit, the program proceeds to step S13 to decrease the proportion Aw of water vapor reformation by a fixed quantity (Aw=Aw−ΔAw where ΔAw is a fixed quantity) for thereby making the reformation temperature rise, and returns to step S2.

In case the quantity of reformed gas in store is beyond the upper limit, the program proceeds to step S13 to increase the proportion Aw of water vapor reformation by a fixed quantity (Aw=Aw+ΔAw) for thereby making the reformation temperature fall, and returns to Step S2.

When it is judged at step S11 that the quantity of reformed gas in store (output of pressure gauge 19) is within the specified limits, the proportion Aw of water vapor reformation is not altered and the program proceeds to step S2.

As having been described above, when the quantity of high octane liquid fuel in store is beyond the specified limits, the supply quantity Gg of fuel is increased or decreased for thereby controlling the production quantity of high octane liquid fuel.

Further, when the quantity of reformed gas in store is beyond the specified limits, the proportion of water vapor reformation reaction to partial oxidation reaction (i.e., proportion Aw of water vapor reformation) is increased or decreased for thereby controlling the production quantity of reformed gas. More specifically, when the quantity of reformed gas in store is decreased beyond the lower limit, the proportion of water vapor reformation reaction is decreased, in other words, the proportion of partial oxidation reaction is increased (i.e., the supply quantity Gw of water is decreased and the supply quantity Ga of air is increased) for making the reformation temperature rise and thereby increasing the production quantity of reformed gas. On the contrary, when the quantity of reformed gas in store increases beyond the upper limit, the proportion of the water vapor reformation reaction is increased, in other words, the proportion of partial oxidation reaction is decreased (i.e., the supply quantity Gw of water is increased and the supply quantity Ga of air is decreased) for making the reformation temperature fall and thereby decreasing the production quantity of reformed gas.

More specifically, it is the characteristics of hydrocarbon that hydrocarbon which is hard to be reformed has a stronger interatomic bond and is therefore a stabler molecule, i.e., hydrocarbon has a high octane value. Accordingly, by condensing the hydrocarbon which remains unreformed even after passage through the reforming device 8, by means of the cooling device 14 and thereby separating it from the reformed gas, a high octane component can be extracted and therefore a high octane liquid fuel can be obtained. However, even such a molecule that has a strong interatomic bond and is therefore stable can be converted to a reformed gas when exposed to a high temperature. Accordingly, to what extend reformation is made varies depending upon a variation of the reformation temperature.

In this connection, the reformation includes a water vapor reformation reaction which is an endothermic reaction and a partial oxidation reaction which is an exothermic reaction.

Water Vapor Reformation Reaction
$C_7H_{13}+7H_2O \rightarrow 13.5H_2+7CO$ (endothermic reaction)
Partial Oxidation Reaction
$C_7H_{13}+3.5O_2 \rightarrow 6.5H_2+7CO$ (exothermic reaction)

Accordingly, by reducing supply of water for thereby decreasing the water vapor reformation reaction and increasing supply of air for thereby increasing the reaction of partial oxidation, the reformation temperature becomes high to cause the reformed gas to be produced in a large quantity.

On the contrary, by increasing supply of water for thereby increasing the water vapor reformation reaction and decreasing supply of air for thereby decreasing the partial oxidation reaction, the reformation temperature becomes low to cause the reformed gas to be produced in a small quantity. Accordingly, by controlling the supply quantity of water and the supply quantity of air, the yield of each of reformed gas and high octane liquid fuel can be controlled.

FIG. 4 shows an internal combustion engine equipped with a fuel reforming system according to a further embodiment of the present invention.

In this embodiment, the reforming device 8 is disposed outside the exhaust system 6 and the flow passage 8a filled with a reforming catalyst is covered by a heat insulating material. Except for the above, this embodiment is substantially similar to the previous embodiment of FIG. 1.

In case the reforming device 8 is disposed outside the exhaust system 6, the exhaust gas of the temperature lower than the reformation temperature does not heat but adversely cools the gaseous mixture from the evaporator 7, so a sufficient reforming action is not obtained. By disposing the reforming device 8 outside the exhaust system 6 and thermally insulating the reforming device 8, the proportion of partial oxidation reaction is increased for attaining a desired reformation temperature.

While in the above described embodiments supply of water to the water tank 11 is necessitated, it can be attained by condensing the water vapor contained in the exhaust gas to obtain water.

From the foregoing, it will be understood that according to the present invention, a hydrocarbon fuel is not separated into a hydrocarbon gas of a low boiling point component and a liquid hydrocarbon of a high boiling point component prior to being supplied to the reforming device, whereby a high octane liquid fuel can be obtained by cooling a reformed gas mixture discharged from the reforming device in a way as to condense the unreformed hydrocarbon gas into the high octane liquid fuel and thereby separating it from the reformed gas.

The entire contents of Japanese Patent Applications P11-098416 (filed Apr. 6, 1999) is incorporated herein by reference.

Although the invention has been described above by reference to a single embodiment of the invention, the invention is not limited to the embodiment described above. Modifications and variations of the embodiment described above will occur to those skilled in the art, in light of the above teachings.

For example, while in the above described embodiments a high octane liquid fuel is injected by the liquid fuel injector 5 directly into the combustion chamber 4, it can be injected into the intake passage of the intake system 2. However, in case the liquid fuel needs to be injected at expansion stroke or exhaust stroke for the purpose of making the exhaust temperature higher, it is injected directly into the combustion chamber 4.

The scope of the invention is defined with reference to the following claims.

What is claimed is:

1. In an internal combustion engine equipped with a fuel reforming system, the fuel reforming system comprising:
   a reforming device for receiving a feed of hydrocarbon fuel, water and air and discharging a reformed gas mixture including a reformed gas and a hydrocarbon gas remaining unreformed, through reformation of said hydrocarbon fuel by a water vapor reformation reaction and a partial oxidation reaction;
   a cooling device for cooling said mixed gas drawn from said reforming device in such a manner that said hydrocarbon gas is condensed into a high octane liquid fuel and separated from said reformed gas; and
   a selection control device for controlling selection of said reformed gas and said high octane liquid fuel for use in the engine in accordance with an engine operating condition.

2. The internal combustion engine according to claim 1, wherein said control device comprises means for selecting said reformed gas for use in the engine at a partial load operating condition of the engine and selecting said high octane liquid fuel for use in the engine at a high load operating condition of the engine.

3. The internal combustion engine according to claim 1, further comprising an evaporator for gasifying said hydrocarbon fuel and said water to be supplied to said reforming device, by using an exhaust heat of the engine.

4. The internal combustion engine according to claim 1, further comprising a pair of tanks for storing said reformed gas and said high octane liquid fuel separated by said cooling device, respectively.

5. The internal combustion engine according to claim 4, further comprising a pair of detectors for detecting a quantity of said reformed gas and a quantity of said high octane liquid fuel kept in store in said tanks, respectively, and a reformation control device for controlling at least one of a quantity of fuel supplied to said reforming device and a temperature at said reforming device in accordance with said quantity of said reformed gas and said quantity of said high octane liquid fuel kept in store in said tanks.

6. The internal combustion engine according to claim 5, wherein said reformation control device is constructed to control said reformation temperature by controlling the proportions of said water vapor reformation reaction and said partial oxidation reaction.

7. The internal combustion engine according to claim 6, wherein said reformation control device is constructed to control the proportions of said water vapor reformation reaction and said partial oxidation reaction through control of a supply quantity of each of hydrocarbon fuel, water and air to be fed to said reforming device.

8. A fuel reforming system for an internal combustion engine, comprising:
   fuel reforming means for converting a hydrocarbon gas mixture containing a hydrocarbon gas, water vapor and air to a reformed gas mixture containing a reformed gas and an unreformed hydrocarbon gas;
   cooling means for cooling said reformed gas mixture and condensing said unreformed hydrocarbon gas into a high octane liquid fuel; and
   control means for controlling selective supply of said reformed gas and said high octane liquid fuel to the engine in accordance with an engine operating condition.

9. The system according to claim 8, wherein said control means comprises means for selecting said reformed gas for use in the engine at a partial load operating condition of the engine and selecting said high octane liquid for use in the engine at a high load operating condition of the engine.

10. The system according to claim 8, further comprising evaporating means for gasifying hydrocarbon fuel and water for production of said hydrocarbon gas mixture, by using an exhaust heat of the engine.

11. The system according to claim 8, further comprising a pair of first and second storage means for storing said reformed gas and said high octane liquid fuel, respectively, a pair of first detecting means and second detecting means for detecting a quantity of said reformed gas and a quantity of said high octane liquid fuel kept in store in said first storage means and said second storage means, respectively, and control means for controlling at least one of a quantity of said hydrocarbon gas supplied to said fuel reforming means and a reformation temperature at said fuel reforming means in accordance with the quantity of said reformed gas and the quantity of said high octane liquid fuel kept in store in said first and second storage means, respectively.

12. The system according to claim 11, wherein said fuel reforming means comprises means for controlling said reformation temperature by controlling proportions of a water vapor reformation reaction and a partial oxidation reaction.

13. The system according to claim 12, wherein said fuel reforming means comprises means for controlling the proportions of said water vapor reformation reaction and said partial oxidation reaction through control of a quantity of hydrocarbon fuel, a quantity of water and a quantity of air which are used to produce said hydrocarbon gas mixture.

14. A process for converting a hydrocarbon fuel to a reformed gas and a high octane liquid fuel for use in an internal combustion engine, comprising:
   mixing said hydrocarbon fuel with water and gasifying a mixture of said hydrocarbon fuel and said water to obtain a mixture of a hydrocarbon gas and water vapor;
   mixing said mixture of said hydrocarbon gas and said water vapor with air to obtain a hydrocarbon gas mixture;
   converting said hydrocarbon gas mixture to a reformed gas mixture containing a reformed gas and an unreformed hydrocarbon gas through reformation by a water vapor reformation reaction and a partial oxidation reaction; and
   cooling said reformed gas mixture in such a manner that said unreformed hydrocarbon gas is condensed into said high octane liquid fuel and separated from said reformed gas.

15. The process according to claim 14, wherein said gasifying comprising heating said mixture of said hydrocarbon fuel and said water by an exhaust heat of the engine.

* * * * *